United States Patent
Shibata

(10) Patent No.: US 7,616,258 B2
(45) Date of Patent: Nov. 10, 2009

(54) IMAGE PICKUP APPARATUS, CONTROL METHOD THEREFOR, AND PROGRAM FOR IMPLEMENTING THE CONTROL METHOD

(75) Inventor: Masahiro Shibata, Yokohama (JP)

(73) Assignee: Canon Kabushiki Kaisha (JP)

( * ) Notice: Subject to any disclaimer, the term of this patent is extended or adjusted under 35 U.S.C. 154(b) by 594 days.

(21) Appl. No.: 11/031,313

(22) Filed: Jan. 7, 2005

(65) Prior Publication Data
US 2005/0146640 A1 Jul. 7, 2005

(30) Foreign Application Priority Data
Jan. 7, 2004 (JP) ............................. 2004-002347

(51) Int. Cl.
H04N 5/225 (2006.01)
(52) U.S. Cl. ................... 348/372; 348/240.99; 348/349
(58) Field of Classification Search .................. 396/80, 396/104, 121, 125, 89; 348/345, 347, 348, 348/240.99, 349, 372
See application file for complete search history.

(56) References Cited

U.S. PATENT DOCUMENTS

| | | | | |
|---|---|---|---|---|
| 3,761,167 A | * | 9/1973 | Henriksen | 352/124 |
| 4,209,685 A | * | 6/1980 | Walter et al. | 219/225 |
| 4,492,982 A | * | 1/1985 | Takimoto et al. | 348/363 |
| 4,548,298 A | * | 10/1985 | Born | 187/268 |
| 4,550,995 A | * | 11/1985 | Toyama | 396/106 |
| 4,591,919 A | * | 5/1986 | Kaneda et al. | 348/348 |
| 4,695,893 A | * | 9/1987 | Makino et al. | 348/348 |
| 4,907,024 A | * | 3/1990 | Takahashi | 396/104 |
| 5,597,999 A | * | 1/1997 | Kinba et al. | 250/201.7 |
| 5,815,748 A | * | 9/1998 | Hamamura et al. | 396/104 |
| 6,686,966 B1 | * | 2/2004 | Hashimoto | 348/348 |
| 6,895,181 B2 | * | 5/2005 | Nonaka et al. | 396/125 |
| 7,280,147 B2 | * | 10/2007 | Kitajima et al. | 348/345 |
| 2002/0080260 A1 | * | 6/2002 | Ojima | 348/348 |
| 2004/0037546 A1 | * | 2/2004 | Nonaka | 396/121 |
| 2004/0057712 A1 | * | 3/2004 | Sato et al. | 396/89 |

FOREIGN PATENT DOCUMENTS

| | | |
|---|---|---|
| JP | 5-64056 A | 3/1993 |
| JP | 2002-258147 A | 9/2002 |

* cited by examiner

Primary Examiner—Lin Ye
Assistant Examiner—Dennis Hogue
(74) Attorney, Agent, or Firm—Rossi, Kimms & McDowell, LLP

(57) ABSTRACT

An image pickup apparatus which is capable of restraining power consumption to the maximum possible extent while improving the AF and zooming performance using distance information. A video signal from an optical image formed through the focus compensation lens is output by a camera signal processing circuit. A focus signal is detected from the video signal by an AF signal processing circuit. Two image signals are detected by an external ranging unit. Focus is adjusted based on results of detection by the AF signal processing circuit and the external ranging unit. A shooting state and an operative state of the image pickup apparatus are determined by an AF microprocessor. Power supply to the external ranging unit is controlled in response to the states determined by the AF microprocessor.

1 Claim, 12 Drawing Sheets

SUBJECT DISTANCE $\quad L = \dfrac{B \cdot f}{X}$

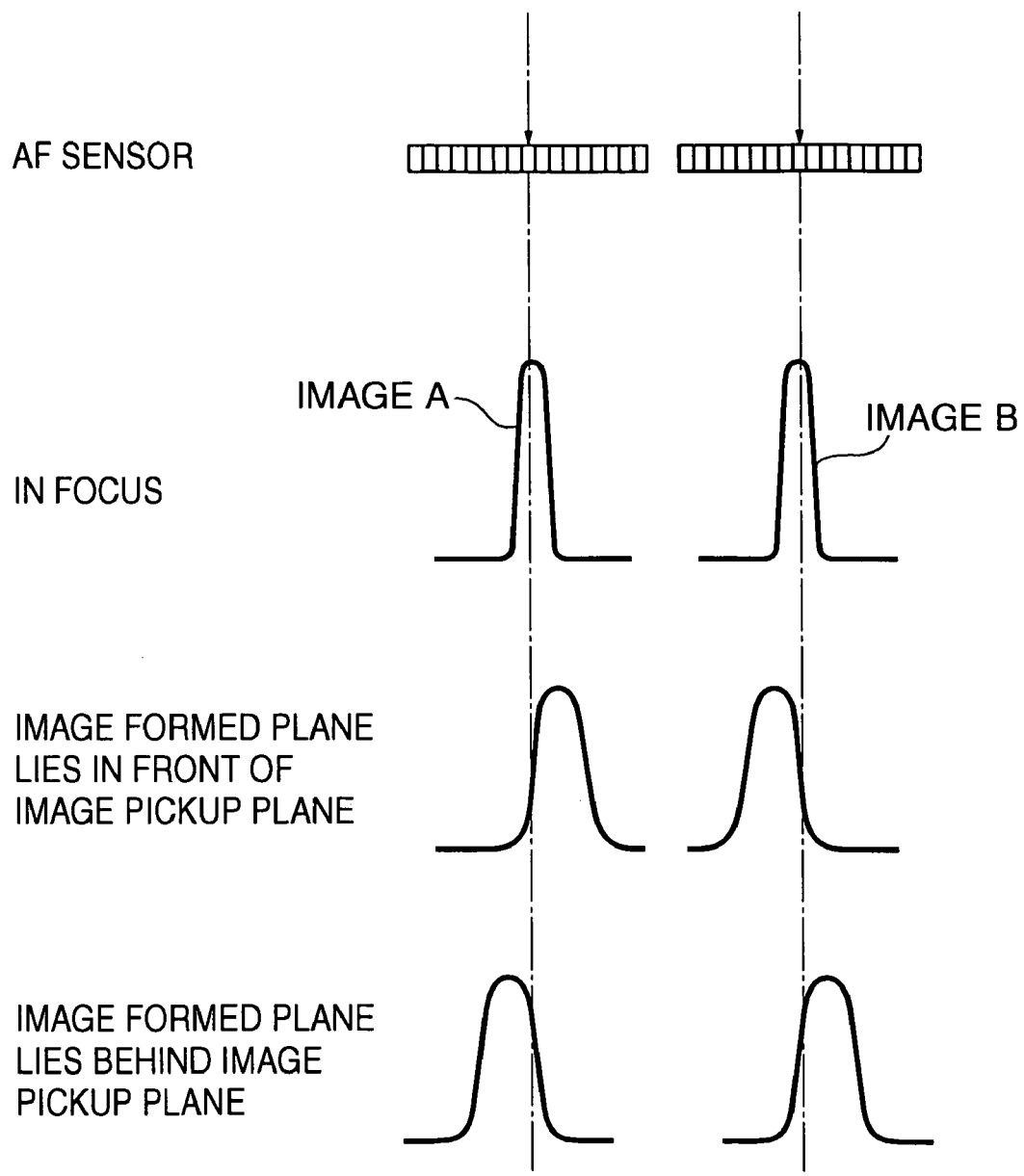

IMAGE PICKUP APPARATUS, CONTROL METHOD THEREFOR, AND PROGRAM FOR IMPLEMENTING THE CONTROL METHOD

CROSS REFERENCE TO RELATED APPLICATION

This application claims priority from Japanese Patent Application No. 2004-002347 filed Jan. 7, 2004, which is hereby incorporated by reference herein.

BACKGROUND OF THE INVENTION

1. Field of the Invention

The present invention relates to an image pickup apparatus such as a video camera, a control method therefor, and a program for implementing the control method.

2. Description of the Related Art

FIG. 7 is a block diagram schematically showing the system configuration of a conventional image pickup apparatus.

In FIG. 7, the conventional image pickup apparatus is comprised of a fixed first lens group 101, a zooming lens group 102 that performs zooming, an aperture 103, a fixed second lens group 104, a lens group 105 (hereinafter a "focus compensation lens") having both a focus adjusting function and a so-called compensation function of correcting the movement of the focal plane due to zooming, an image pickup device (a CCD (Charge Coupled Device)), a zoom drive that drives the zooming lens group 102, a focusing drive 111 that drives the focus compensation lens group 105, and a CDS (Correlated Double Sampling)/AGC (Automatic Gain Control) circuit 107 that amplifies an output from the CCD 106.

A camera signal processing circuit 108 converts an output signal from the CDS/AGC circuit 107 into signals that are adapted to a recording device 109 and a monitor device 115 equipped with a display function. The recording device 109 records moving images and still images, with a storage medium such as a magnetic tape or a semiconductor memory.

An output signal from the CCD 106 is passed through an AF (Auto Focus) gate 112, which sets a range from which an optimum signal for focusing is to be extracted from within the entire screen. The size of the gate can be varied, and in some cases a plurality of gates are provided.

An AF signal processing circuit 113 extracts high-frequency components, low-frequency components and luminance difference components (that is, the difference between maximum and minimum values of the luminance level of a video signal) used for focus detection.

A camera/AF microprocessor 114 controls the zoom drive 110 and the focusing drive 111, based on an output signal from the AF signal processing circuit 113, and also controls a zoom switch 116 and an output signal from the camera signal processing circuit 108.

In the image pickup apparatus configured as shown in FIG. 7, the AF microprocessor 114 moves the focus compensating lens 105 so that the output signal level of the AF signal processing circuit 113 becomes the maximum, thus carrying out auto focus adjustment.

Next, a description will be given of an AF operation.

A TV signal AF method is mainly used in an auto focus device for video cameras. The TV signal AF method detects the sharpness of the screen from a video signal obtained by photoelectric conversion of the subject image by an image pickup device or the like and moves the focus lens so that the detected sharpness value, that is, an AF evaluation value, becomes the maximum, thus carrying out focus adjustment.

As the AF evaluation value, generally, high-frequency components of the video signal extracted by a band pass filter that allows only a certain frequency band to pass are used. The high-frequency components of a video signal obtained by shooting a subject image are typically such as shown in FIG. 8. The point at which the AF evaluation value becomes the maximum is the in-focus point, as shown in FIG. 8.

A description will be given of AF control carried out by the camera/AF microprocessor 114 during shooting of a moving image, with reference to a flow chart shown in FIG. 9.

In FIG. 9, when a moving image AF process is started, first, the focus compensation lens 105 is driven by a fine amount (microactuation) (step S101).

Next, it is determined whether or not the microactuation has brought the subject image into focus (step S102). If it is determined that the subject image has not been brought into focus, then it is determined whether or not the moving direction of the focus compensation lens 105 has been discriminated as a focusing direction (step S103). If it is determined that the moving direction of the focus lens 1505 has not been discriminated as a focusing direction, the process returns to the step S101. By contrast, if it is determined that the moving direction of the focus lens 1505 has been discriminated as a focusing direction, then the focus compensation lens 105 is driven at a high speed in a direction in which the AF evaluation value increases using the mountain climbing driving method (step S104).

Next, it is determined whether or not the AF evaluation value has passed a peak due to mountain climbing drive (step S105). If it is determined that the AF evaluation value has not passed a peak, the process returns to the step S104 and mountain climbing drive is continued. By contrast, if it is determined that the AF evaluation value has passed a peak, then the focus compensation lens 105 is driven in the opposite direction (step S106) to return the AF evaluation value during mountain climbing drive to the peak. Then, it is determined whether or not the AF evaluation value has reached the peak (step S107). If it is determined that the AF evaluation value has not reached the peak, the process returns to the step S106, where the operation of returning the AF evaluation value to the peak is continued. By contrast, if it is determined that the AF evaluation value has not reaches the peak, the process returns to the step S101, where the focus compensation lens 105 is driven by macroactuation to search for an in-focus position of the next moving image.

If it is determined in the step S102 that the subject image has been brought into focus, then the focus compensating lens 105 is stopped (step S108), the AF evaluation value when the subject image came into focus is stored (step S109), and a process for restart determination is carried out. That is, the last AF evaluation value stored in the step S109 and the present AF evaluation value obtained in the step S110 are compared, and if the difference between the two values exceeds a predetermined level, it is determined that restart is required (step S111). If as a result it is determined that restart is required, the process returns to the step S101 to start macroactuation drive operation. By contrast, if it is determined that restart is not required, then the focus compensation lens 105 is stopped and held in its current position (step S112), and thereafter, to accommodate a subsequent moving image, the process returns to the step S110 and the restart determination process is continued.

In the above described way, the camera AF microcomputer 114 drivingly controls the focus lens 105 by repeatedly carrying out the sequence of processes of restart determination→microactuation→mountain-climbing driving→microactuation→restart determination, such that the AF evaluation value is constantly maximized.

On the other hand, as a method widely used in single lens reflex cameras employing silver salt film, there is a phase difference detection method. According to the phase difference detection method, a light beam passing through the exit pupil of a taking lens are divided into two light beams, the two light beams are each received by a pair of focus detecting sensors, and an offset amount between output signals from the sensors, that is, a relative position offset amount between the two light beams in the direction of division of the light beam is determined according to the received amounts of light beams, to thereby determine the amount of offset of the taking lens in the focusing direction in a direct manner. Therefore, by carrying out a single accumulating operation using the focus detecting sensors, the amount and focusing direction offset are obtained, making a high-speed focus adjustment operation possible. It should be noted that, to divide the light beam into two light beams and obtain signals corresponding to the respective light beams, generally two systems each consisting of a focus detection optical system and a sensor are provided.

An AF method using an external ranging sensor includes, as a passive method, a method using a principle as shown in FIGS. 10 and 11. The external ranging sensor has first and second light paths, each having an image forming lens and a photo-detector array. Two signals of formed images of a subject passing through the first and second light paths are read out from the photo-detector arrays, and the correlation between the two subject image signals is calculated through an arithmetic operation. Specifically, it is arithmetically determined how many pixels one of the subject image signals should be shifted to make the correlation between both signals the maximum, to obtain distance information based on the amount of shift calculated by the arithmetic operation, using the principle of triangulation.

This arithmetic calculation principle is such that, first, as shown in FIG. 11, a shift amount X at which the correlation is maximized is calculated, and then, as shown in FIG. 10, a distance L to the subject is calculated from a distance B between a known focal distance f and the two optical path optical systems by proportionality calculation.

Moreover, as an active method, there is a method in which a propagation speed is measured using an ultrasound sensor, and a method in which triangulation is carried out using an infrared sensor widely used in compact cameras.

Furthermore, an auto focus device that is a combination of the external ranging method or the phase difference detection method and a TV signal AF method has been proposed (see, for example, Japanese Laid-Open Patent Publication (Kokai) No. H05-064056 and Japanese Laid-Open Patent Publication (Kokai) No. 2002-258147). This auto focus device calculates the distance and direction to the in-focus position using the phase difference detection method, moves the lens to the in-focus position, and corrects any focus offset using the TV signal AF method. The method using a combination of the TV signal AF method and the external ranging method has the advantage that the focusing direction can be instantaneously determined if distance information is used in the mountain climbing operation according to the TV signal AF method, as well as the advantage that the focus lens can be moved in the focusing direction while confirming the distance to the subject during the mountain climbing operation. As a result, the distance information is effectively used to enable a high-speed focusing operation, and at the same time high-accuracy focusing can be achieved by an AF operation using an AF evaluation value obtained by the TV signal AF method.

However, the image pickup apparatus equipped with the auto focus device that is a combination of the TV signal AF method and the external ranging method has not been conventionally subjected to studies as to the electric power consumed by the external ranging sensor.

In the mountain climbing operation of the TV signal AF method, although the use of the distance information is very effective, in the vicinity of the in-focus position, a focusing operation can be achieved with sufficiently high accuracy using only the AF evaluation values of the TV signal AF method, and the distance information is not always required. Moreover, during a zooming operation as well, with zooming in the direction from wide angle to telephoto, the cam locus is dispersed, and with the AF evaluation value of the TV signal AF method AF alone it is difficult to continue to accurately grasp the distance to the subject due to the effects of change in the angle of view among other things. Therefore, the use of the distance information is effective. Conversely, with zooming from telephoto to wide angle, the cam locus is converged, and if the subject image is brought into focus at the start of the zoom, then by tracking the cam locus identified at that time point, it is easy to maintain the in-focus state even while zooming, and hence the distance information is not always required.

Thus, as described above, cases where the distance information is not essentially required include, for example, a case where the subject image is focused, a case where an in-focus estimating operation is carried out using only the AF evaluation value, and a case where zooming is carried out from telephoto to wide angle. Conversely, cases where the distance information is required include, for example, a case where it is immediately after the power is turned on, a case where it is immediately after switching from MF (Manual Focus) to AF, a case where searching for the direction in which the AF evaluation value increases to the maximum value, a case where fluctuation of the AF evaluation value is great, and a case where zooming is carried out from wide angle to telephoto.

If the external ranging unit is constantly supplied with electrical power, then the distance sensor (ranging sensor) wastefully consumes power even when the distance information is not always required as stated above.

SUMMARY OF THE INVENTION

It is an object of the present invention to provide an image pickup apparatus and a control method therefor which are capable of restraining power consumption to the maximum possible extent while improving the AF and zooming performance using distance information, and a program for implementing the control method.

To attain the above object, in a first aspect of the present invention, there is provided an image pickup apparatus comprising a focus lens, a signal processing device that outputs a video signal from an optical image formed through the focus lens, a lens driving device that drives the focus lens, a first detecting device that detects a focus signal from the video signal output from the signal processing device, a second detecting device that detects two image signals from a subject, a focus adjusting device that adjusts focus based on results of detection by the first detecting device and the second detecting device, a state determining device that determines a shooting state and an operative state of the image pickup apparatus, and a power control device that controls power supply to the second detecting device in response to the states determined by the state determining device.

Preferably, the state determining device determines the operative state based on results of detection by the first detecting device.

More preferably, the state determining device determines a shooting state of the image pickup apparatus operated by an operator.

Also preferably, the power control device cuts off power to the second detecting device when the state determining device determines that the image pickup apparatus is an in-focus status.

Also preferably, the power control device cuts off power to the second detecting device when the state determining device determines that the image pickup apparatus is an in-focus estimating status.

Also preferably, the power control device supplies power to the second detecting device when the state determining device determines that the image pickup apparatus is in a state where a direction in which the focus signal becomes a maximum is searched.

Also preferably, the power control device supplies power to the second detecting device when the state determining device determines that the focus signal undergoes a change of large amplitude.

More preferably, the image pickup apparatus comprises a main power supply and power control device supplies power to the second detecting device when the state determining device determines that the main power supply has just been turned on.

Also preferably, the power control device supplies power to the second detecting device when the state determining device determines that the image pickup apparatus has just been switched from manual focus adjustment to automatic focus adjustment.

Also preferably, the power control device supplies power to the second detecting device when the state determining device determines that the image pickup apparatus is carrying out zooming from wide angle to telephoto.

To attain the above object, in a second aspect of the present invention, there is provided a control method for an image pickup apparatus including a focus lens, a signal processing device that outputs a video signal from an optical image formed through the focus lens, a lens driving device that drives the focus lens, a first detecting device that detects a focus signal from the video signal output from the signal processing device, a second detecting device that detects two image signals from a subject, and a focus adjusting device that adjusts focus based on results of detection by the first detecting device and the second detecting device, the control method comprising a state determining step of determining a shooting state and an operative state of the image pickup apparatus, and a power control step of controlling power supply to the second detecting device in response to the states determined in the state determining step.

To attain the above object, in a third aspect of the present invention, there is provided a program for causing a computer to execute a control method for an image pickup apparatus including a focus lens, a signal processing device that outputs a video signal from an optical image formed through the focus lens, a lens driving device that drives the focus lens, a first detecting device that detects a focus signal from the video signal output from the signal processing device, a second detecting device that detects two image signals from a subject, and a focus adjusting device that adjusts focus based on results of detection by the first detecting device and the second detecting device, the program comprising a state determining module for determining a shooting state and an operative state of the image pickup apparatus, and a power control module for controlling power supply to the second detecting device in response to the states determined by the state determining module.

With the configuration according to the present invention, the shooting state and the operative state of the image pickup apparatus are determined, and the supply of power to the second detecting device is controlled depending on the determined states. As a result, power consumption can be reduced while AF and zooming performance is improved.

The above and other objects, features, and advantages of the invention will become more apparent from the following detailed description taken in conjunction with the accompanying drawings.

BRIEF DESCRIPTION OF THE DRAWINGS

FIG. 12 is a diagram useful in explaining a method of calculating a distance to a subject.

DETAILED DESCRIPTION OF THE PREFERRED EMBODIMENTS

The present invention will now be described in detail, with reference to the accompanying drawings showing preferred embodiments thereof.

Figure 1:
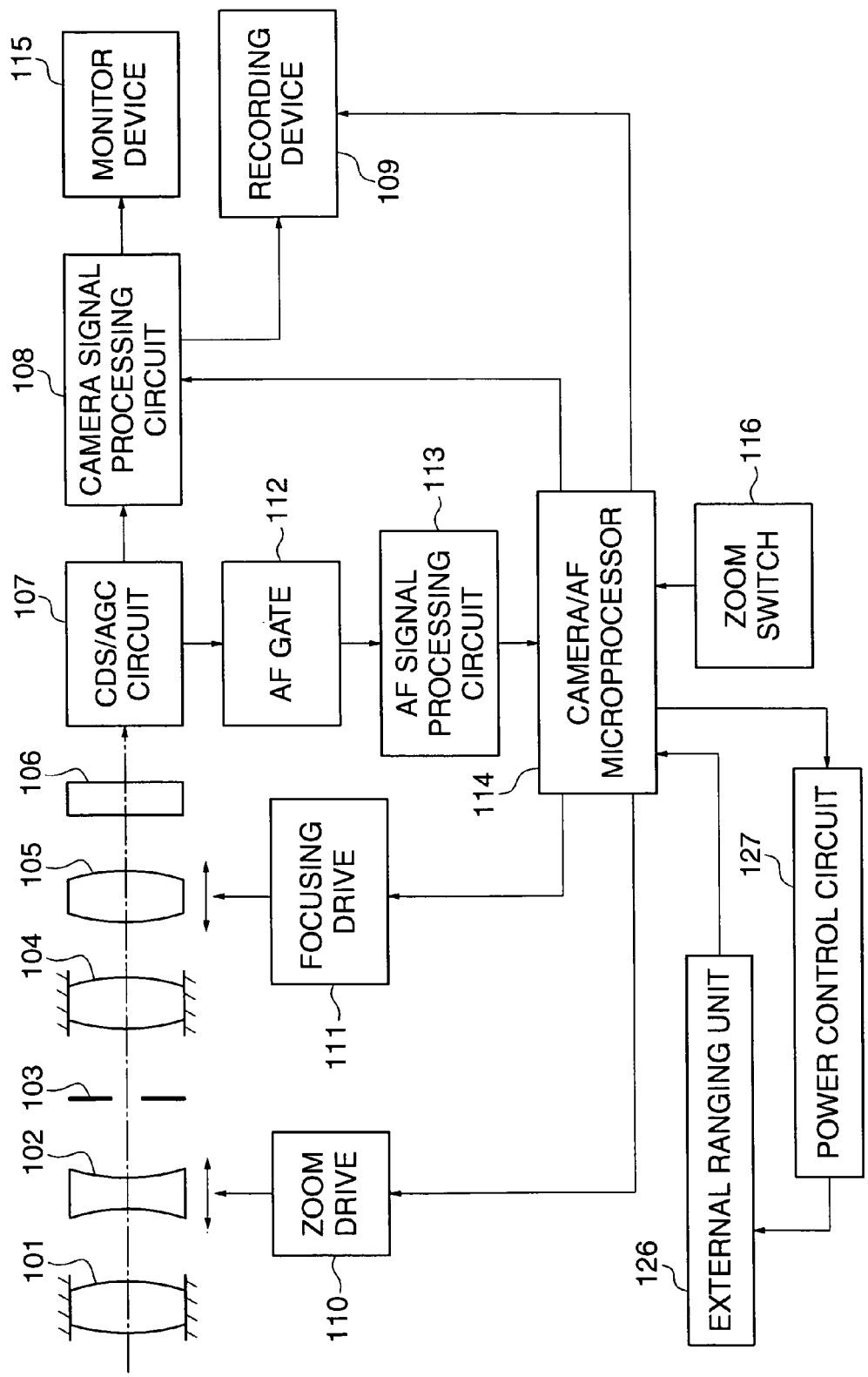
FIG. 1 is a block diagram schematically showing the system configuration of an image pickup apparatus according to a first embodiment of the present invention.

FIG. 1 is a block diagram schematically showing the system configuration of an image pickup apparatus according to a first embodiment of the present invention.

Figure 7:
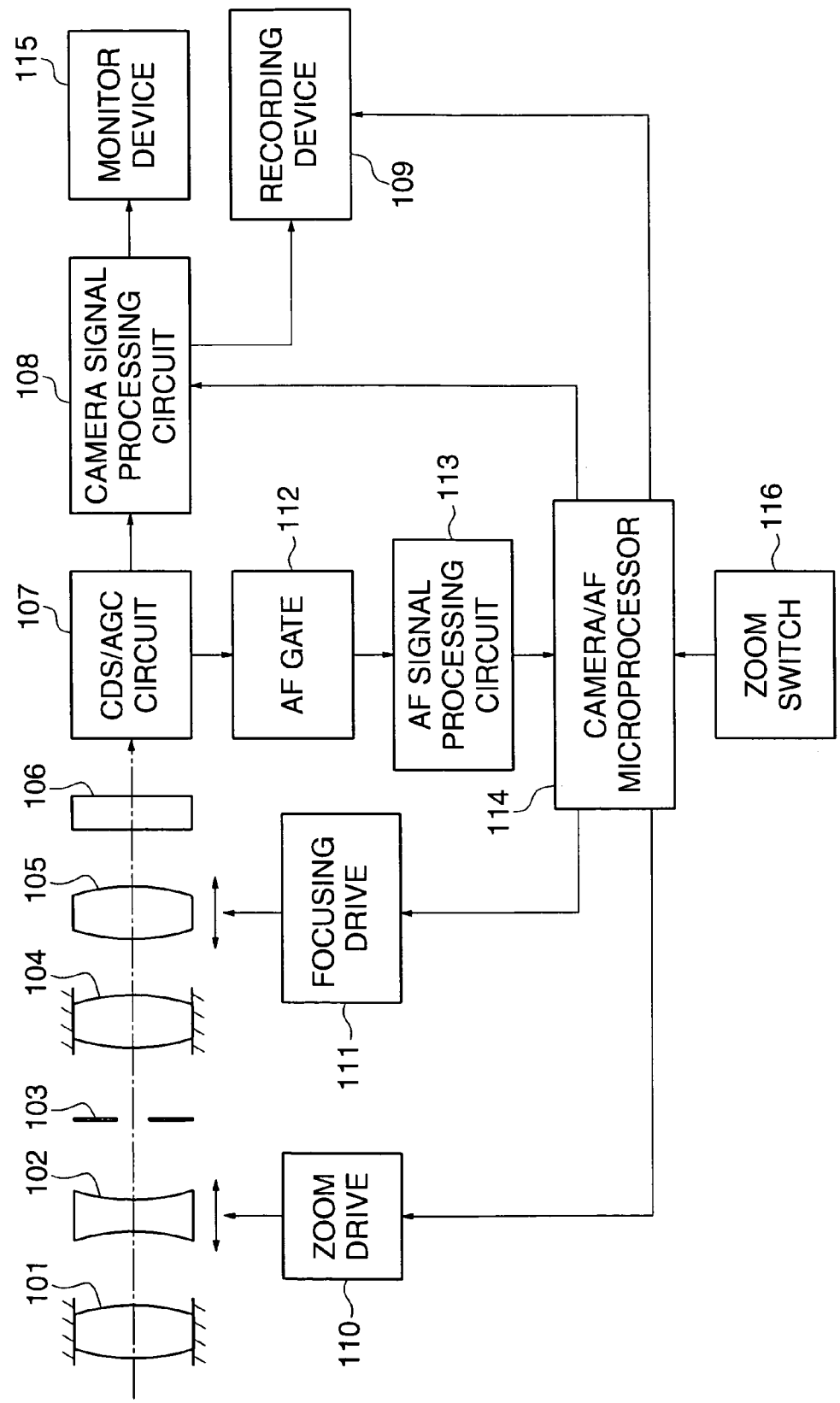
FIG. 7 is a block diagram schematically showing the system configuration of a conventional image pickup apparatus.

In FIG. 1, component elements corresponding to those shown in FIG. 7 are designated by identical reference numerals, and description thereof is omitted.

In FIG. 1, the image pickup apparatus according to the present embodiment includes an external ranging unit 126, and a power control circuit 127 that controls the supply of power to the external ranging unit 126.

As the AF method using an external ranging unit, as described above, the active method and the passive method and the like have been conventionally used, according to which the external ranging unit 126 measures the distance to the subject and outputs the resulting distance information. An AF microprocessor 114 compares output results from the external ranging unit 126 and distance information indicative of a distance at which focusing is obtained with the current lens positions of a zooming lens group 102 and a focus compensation lens 105, and calculates an offset amount and an offset direction.

A description will now be given of control processing executed by the image pickup apparatus constructed as above.

Figure 2:
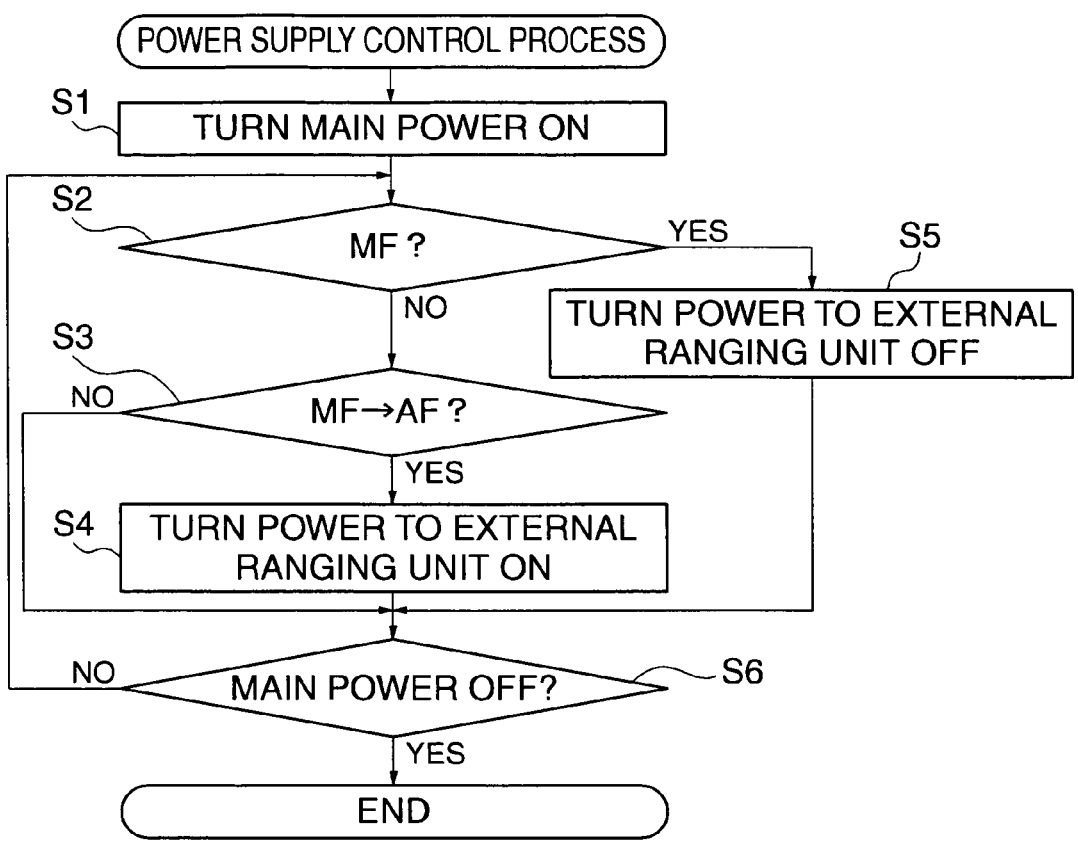
FIG. 2 is a flow chart showing an algorithm of a power supply control process for controlling power supply to an external ranging unit according to a shooting state (ON/OFF of a main power supply and switchover of AF/MF) of the image pickup apparatus operated by an operator.
Figure 3:
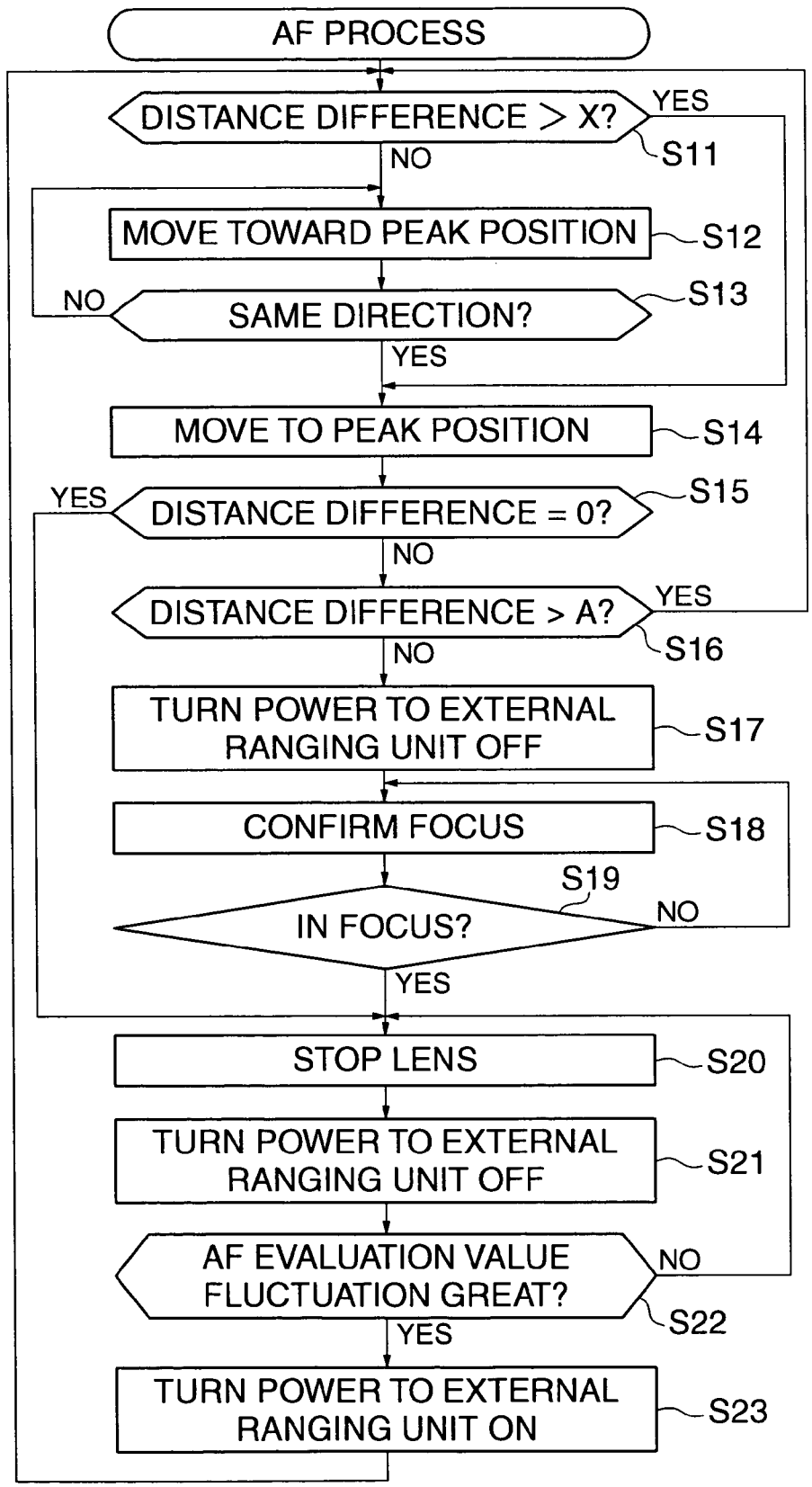
FIG. 3 is a flow chart showing an algorithm of the power supply control process for controlling power supply to the external ranging unit during an AF processing operation.

FIG. 2 is a flow chart showing an algorithm of a power supply control process for controlling power supply to the external ranging unit 126 according to a shooting state (turning on/off of a main power supply and switching between AF mode and MF mode) of the image pickup apparatus operated by an operator). FIG. 3 is a flow chart showing an algorithm of the power supply control process for controlling power supply to the external ranging unit 126 during an AF processing operation.

First, a description will be given of the algorithm shown in FIG. 2.

In FIG. 2, first, in a step S1, when the operator turns the main power on, power is supplied to the image pickup apparatus according to the present embodiment as well as to the external ranging unit 126. As a result, the external ranging unit 126 obtains subject distance information.

Next, in a step S2, it is determined whether a current focusing operation is executed in an AF mode or in a MF mode. If the current focusing operation is executed in the MF mode, the process proceeds to a step S5, while if the focusing operation is executed in the AF mode, the process proceeds to a step S3.

In the step S3, it is determined whether or not the focusing operation mode has just been switched from the MF mode to the AF mode. If yes, the process proceeds to a step S4. If not, the process proceeds to a step S6.

In the step S4, because the focusing operation mode has just been switched to the AF mode, a signal to the power control circuit 127 is turned on to start supply of power to the external ranging unit 126 so as to be able to obtain the subject distance information.

In the step S5, because the focusing operation is in the MF mode, which does not require subject distance information, the signal to the power control circuit 127 is turned off to cut off the supply of power the external ranging unit 126.

Next, in the step S6, it is determined whether or not the main power has been turned off. If the main power has not been turned off, the process returns to the step S2 where the above described processing is repeated. If the main power has been turned off, the process is terminated.

It should be noted that the above described series of processing is carried out with a period synchronous with a vertical signal in response to results of constant monitoring of the state of operation-carried out by the operator.

Thus, as described above, when the main power is turned on with the apparatus in the AF mode, and immediately after the apparatus focusing operation mode is switched from the MF mode to the AF mode, power is supplied to the external ranging unit 126 so that subject distance information can be obtained and used in the AF operation, which makes it possible to achieve a high-speed AF operation.

Next, a description will be given of the algorithm of the AF process shown in FIG. 3. The AF process shown in FIG. 3 is carried out after execution of the step S4 shown in FIG. 2 when the operator turns the main power on with the apparatus in the AF mode, or when the focusing operation mode is switched from the MF mode to the AF mode, and is repeatedly executed as long as the focusing operation mode remains in the AF mode.

In FIG. 3, first, in a step S11, it is determined whether or not a difference in distance between subject distance information estimated from the current lens position and the subject distance information detected by the external ranging unit 126 is greater than a predetermined threshold value X. If the distance difference is greater than the predetermined threshold value X, the process proceeds to a step S14, while if the distance difference is smaller than the predetermined threshold value X, the process proceeds to a step S12.

In the step S12, the focus compensation lens 105 is moved by a predetermined amount in a direction in which an AF evaluation value increases (a direction toward a peak), and then in a step S13, it is determined whether or not the focus compensation lens 105 has been moved a predetermined number of times in the same direction. At this time, if the focus compensation lens 105 has been moved, the process proceeds to the step S14, while if the focus compensation lens 105 has not been moved, the process returns to the step S12.

In the step S14, the focus compensation lens 105 is moved to an AF evaluation value peak position while confirming the foregoing distance difference.

Next, in a step S15, a difference in distance between the AF evaluation value peak position and the subject distance information detected by the external ranging unit 126 is determined. If the distance difference is "0", then it is determined that an in-focus position has been reached and confirmed, and the process proceeds to a step S20. If the distance difference is not "0", the process proceeds to a step S16.

In the step S16, it is determined whether or not the distance difference is greater than a predetermined threshold value A. If the distance difference is greater than the predetermined threshold value A, the process returns to the step S11 to repeat the foregoing processing. If the distance difference is not greater than the predetermined threshold value A, the process proceeds to a step S17.

In the step S17, it is determined that the focus compensation lens 105 is at or in the vicinity of an in-focus position with the subject distance detected by the external ranging unit 126, and the signal to the power control circuit 127 is turned off to cut off the power supply to the external ranging unit 126 so as to carry out a focusing operation using the TV signal AF method alone without using the distance data.

Figure 8:
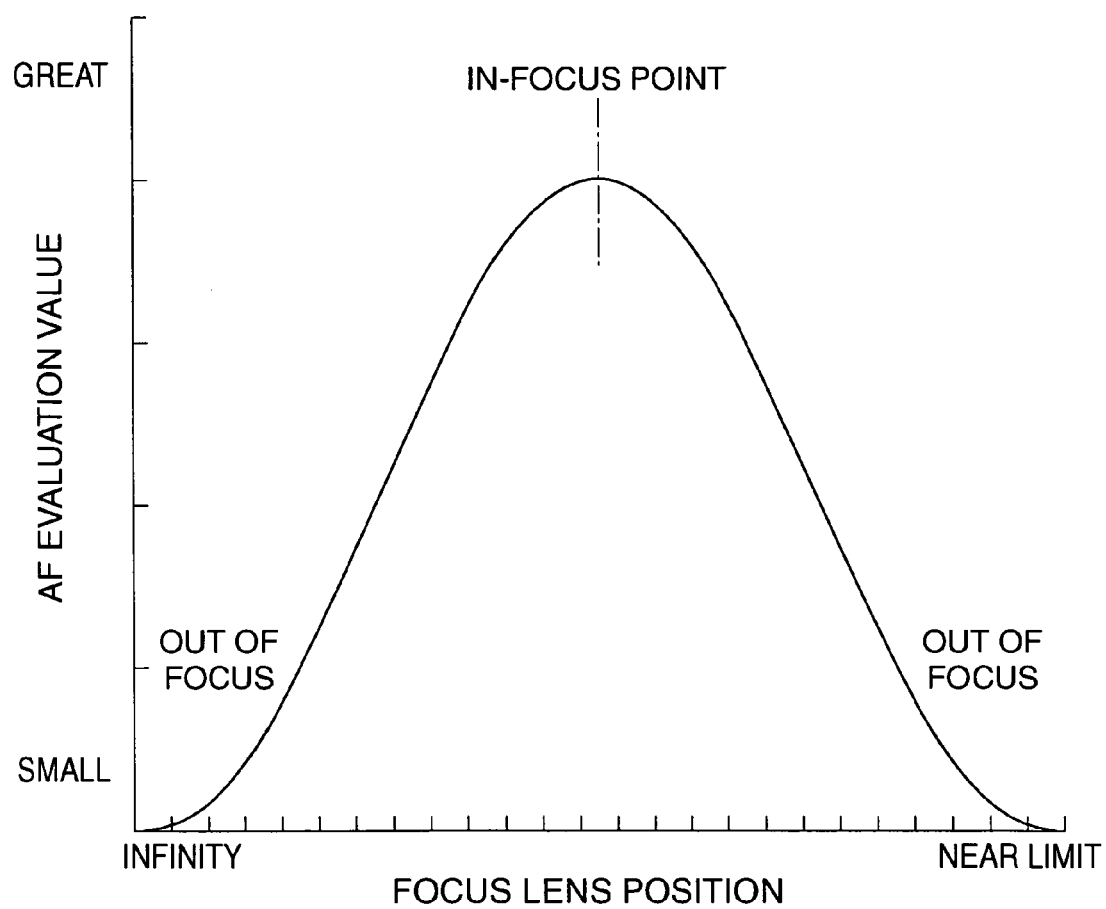
FIG. 8 is a graph showing the principle of auto focus in the conventional TV signal AF method.
Figure 9:
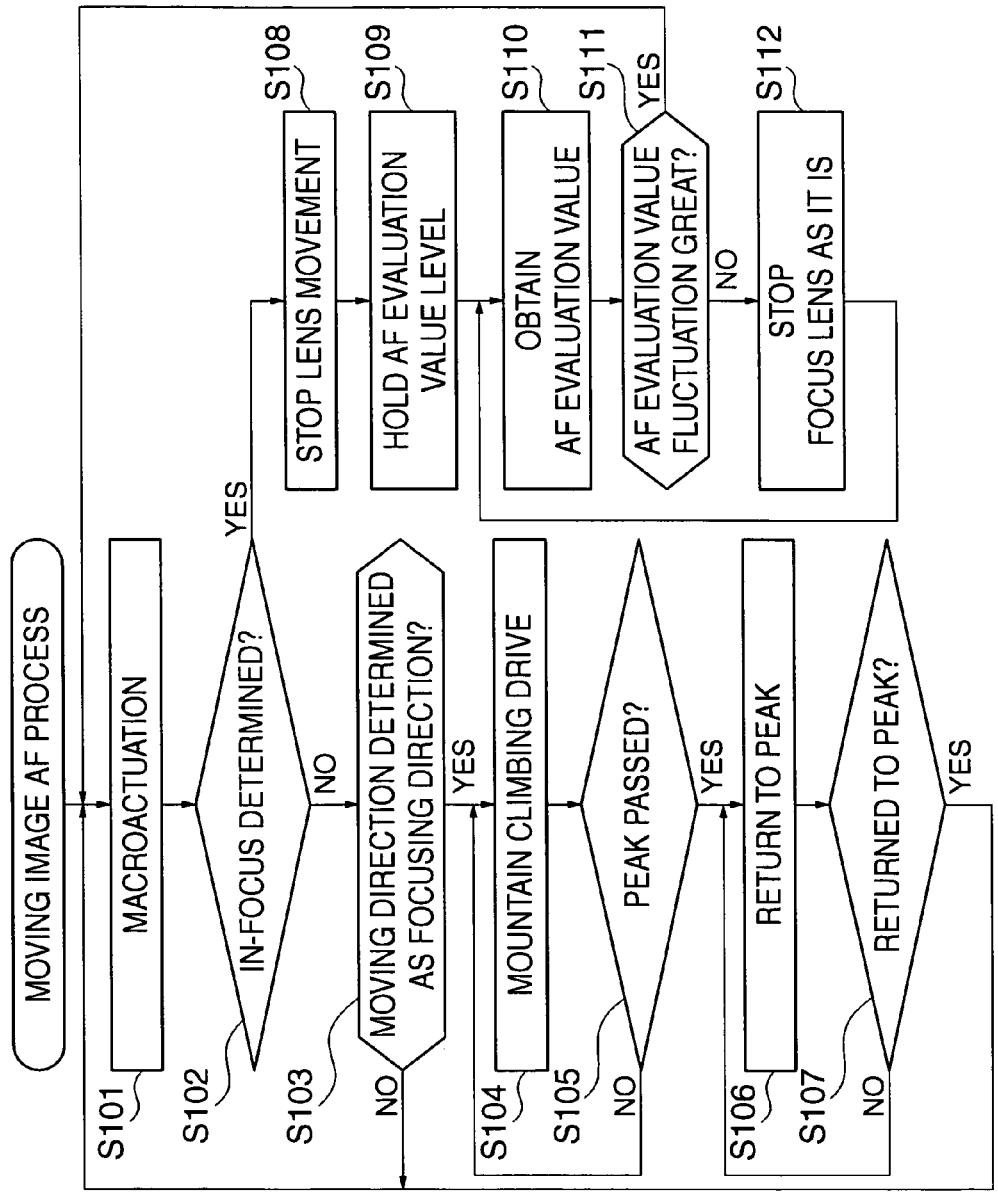
FIG. 9 is a flow chart showing an algorithm of a conventional AF control process during moving image shooting.

Next, in a step S18, the focus compensation lens 105 is finely driven by microactuation, to thereby carry out an in-focus estimating operation in order to detect a mountain top (peak) as a peak value of an AF evaluation value as shown in FIG. 8, referred to before. In a step S19, it is determined whether or not the in-focus position has been confirmed. If yes, the process proceeds to a step S20, while if not, the process returns to the step S18.

In the step S20, the focus compensation lens 105 is stopped at the confirmed in-focus position, and then in a step S21, the signal to the power control circuit 127 is turned off to cut off the supply of power to the external ranging unit 126. Then, in a step S22, it is determined whether or not fluctuation in the AF evaluation value is greater than a predetermined value. If the fluctuation is larger than the predetermined value, the process proceeds to a step S23, while if the fluctuation is smaller than the predetermined value, the process returns to the step S20.

In the step S23, it is determined that the AF evaluation value fluctuation is large, that is, the distance to the subject has changed, and the signal to the power control circuit 127 is turned on to supply power to the external ranging unit 126, after which the process returns to the step S11, where the focus compensation lens 105 is reactivated and the process is repeated.

Thus, as described above, according to the present embodiment, when an in-focus state is achieved (YES to the step S19), and when an in-focus state is estimated (YES to the step S16), power supply to the external ranging unit 126 is cut off, thus reducing power consumption by the external ranging unit 126. Moreover, when searching for the AF evaluation value peak (the step S11) or when the AF evaluation value fluctuation is large (YES to the step S22), power is supplied to the external ranging unit 126, whereby subject distance information can be obtained and used in the AF operation, thus making it possible to achieve a high-speed AF operation.

Next, a description will be given of an image pickup apparatus according to a second embodiment of the present invention. The system configuration of the image pickup apparatus according to the second embodiment is the same as the system configuration of the image pickup apparatus according to the first embodiment described above, and therefore the following description refers to the system configuration shown in FIG. 1 as it is.

The image pickup apparatus of the second embodiment is characterized by a power supply control process for controlling power supply to the external ranging unit 126 during a zooming operation.

First, a description will be given of an inner focus type lens system.

The lens system shown in FIG. 1 is an inner focus type lens system. As is known, with an inner focus type lens system, the focus compensation lens 105 has both a compensator lens function and a focal point adjustment function, and therefore, the position of the focus compensation lens 105 that focuses the subject image on the image pickup plane 106 differs depending on the focal distance even with the distance to the subject remaining the same.

Figure 4:
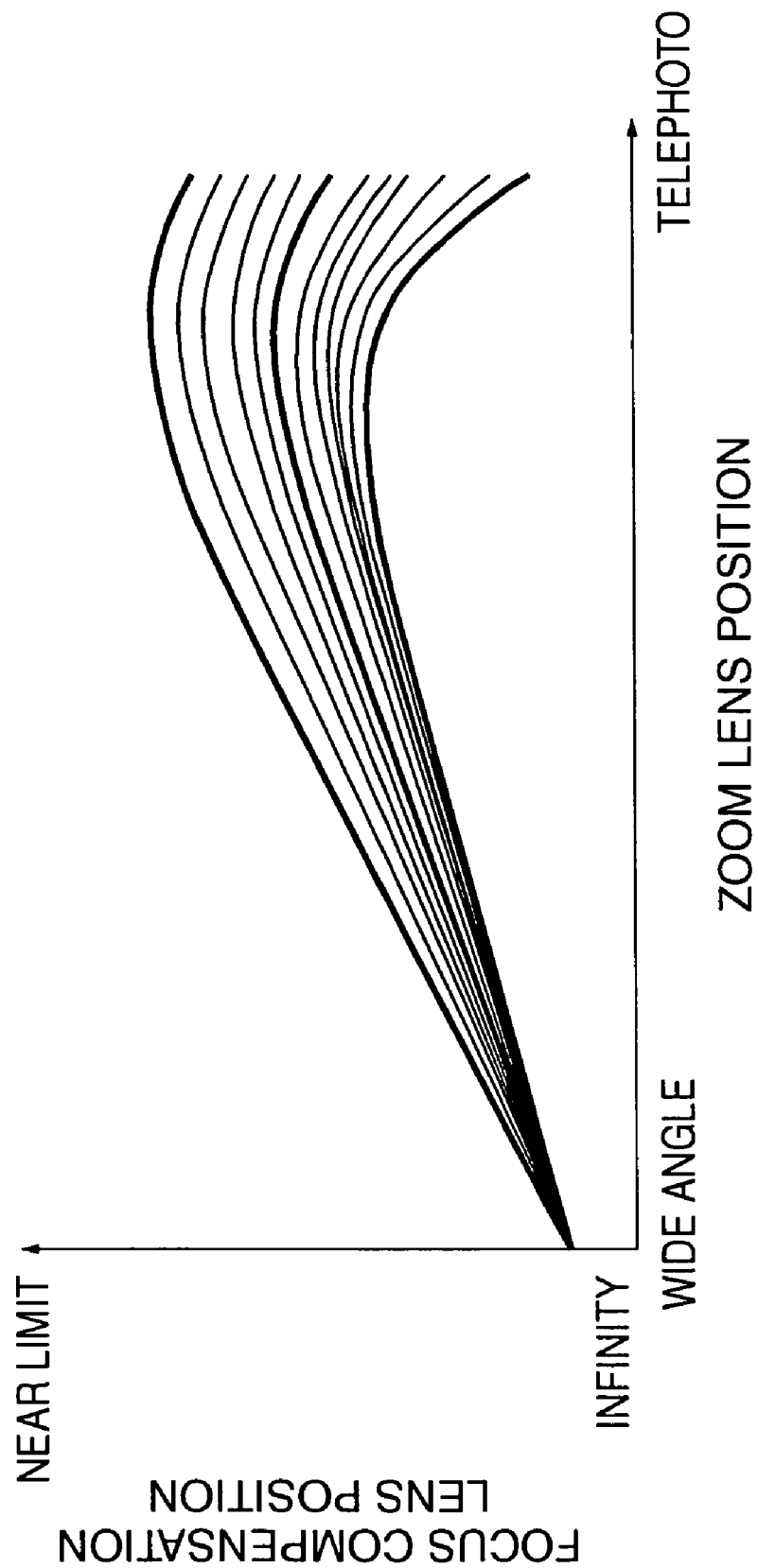
FIG. 4 is a diagram showing an example of cam locus data.

When changing the focal distance, that is, when changing the position of the zooming lens group 102, the position of the focus compensation lens 105 that brings the subject image into focus with arbitrary subject distances are represented by curved lines as shown in FIG. 4. Of the curved lines shown in FIG. 4, the lowest curved line corresponds to the position of the lens 105 that brings the subject image into focus with the infinite subject distance, with the higher curved lines corresponding to positions of the lens 105 that brings the subject image into focus with subject distances progressively closer to the image pickup plane. Accordingly, when carrying out zooming while shooting a subject at an arbitrary subject distance, by driving the focus compensation lens 105 so as to track the locus of a curved line corresponding to that subject distance shown in FIG. 4, zooming can be carried out in an in-focus state. Generally, in an image pickup system equipped with an inner focus lens, a control method is used in which a plurality of locus information as shown in FIG. 4 is stored in a lens control microcomputer (microprocessor) or the like in some form, and the focus compensation lens 105 is driven in accordance with the locus information determined by driving of the zooming lens group 102.

Next, a description will be given of the algorithm of the power supply control process during a zooming operation executed by the image pickup apparatus of the second embodiment, with reference to FIG. 5.

Figure 5:
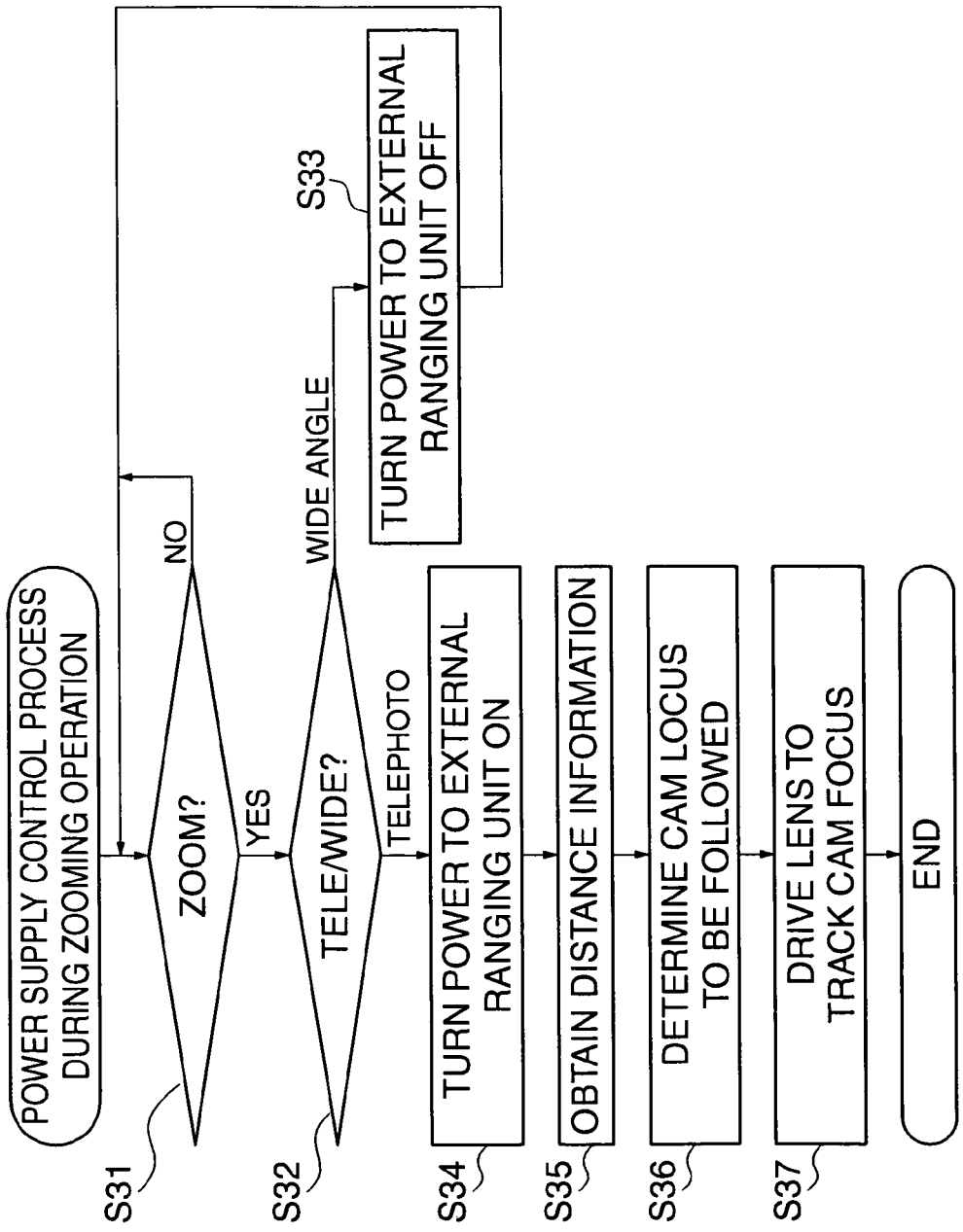
FIG. 5 is a flow chart showing an algorithm of a power supply control process for controlling power supply to an external ranging unit during a zooming operation executed by an image pickup apparatus according to a second embodiment of the present invention.

In FIG. 5, first, in a step S31, it is determined whether or not a zooming operation is being carried out. If the zooming operation is being carried out, the process proceeds to a step S32, while if the zooming operation is not being carried out, the process returns to the step S31 to again confirm the operative state.

In the step S32, the direction in which the zooming is being carried out, that is, whether toward telephoto or toward wide angle, is determined. If the zooming toward wide angle is being carried out, the process proceeds to a step S33, while if the zooming toward telephoto is being carried out, the process proceeds to a step S34. In the step S33, the signal to the power control circuit 127 is turned off to cut off the supply of power to the external ranging unit 126, and the process returns to the step S31. In the step S34, the signal to the power control circuit 127 is turned on to start the supply of power to the external ranging unit 126.

Next, in a step S35, detected subject distance information is obtained from the external ranging unit 126, and in a step S36, based on the detected subject distance information obtained in the step S35, a cam locus to be followed is determined from among the curved lines shown in FIG. 4. In a step S37, the zooming lens group 102 is driven from wide angle to telephoto and the focus compensation lens 105 is driven so as to track the determined cam locus.

Next, a description will be given of a locus tracking method when the zooming lens group 102 is driven from wide angle to telephoto.

Figure 6A:
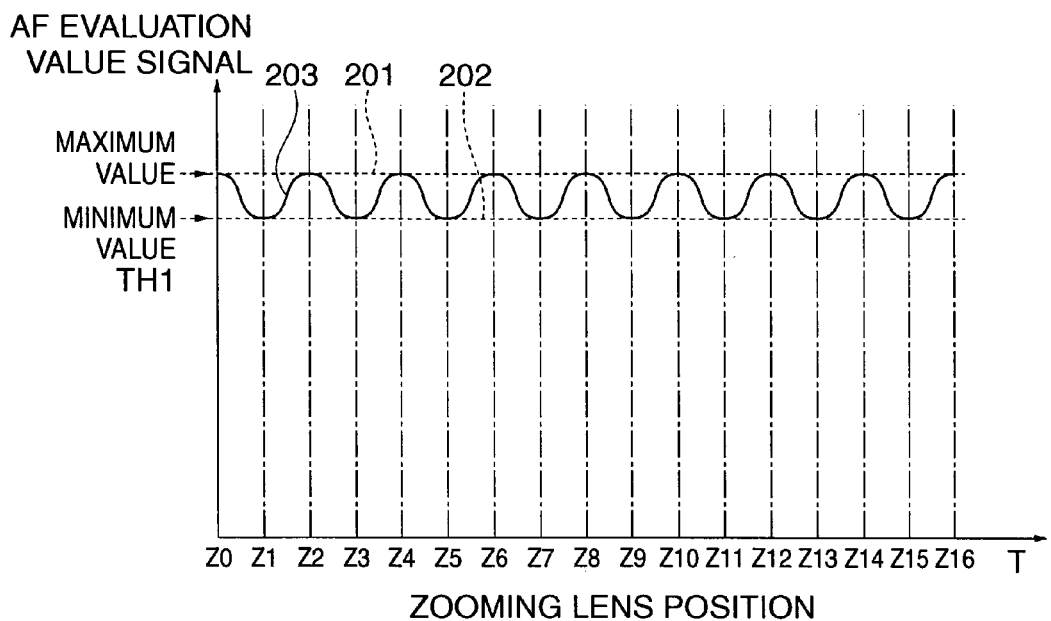
FIGS. 6A and 6B are diagrams useful in explaining an example of a cam locus tracking method when zooming from wide angle to telephoto.
Figure 6B:
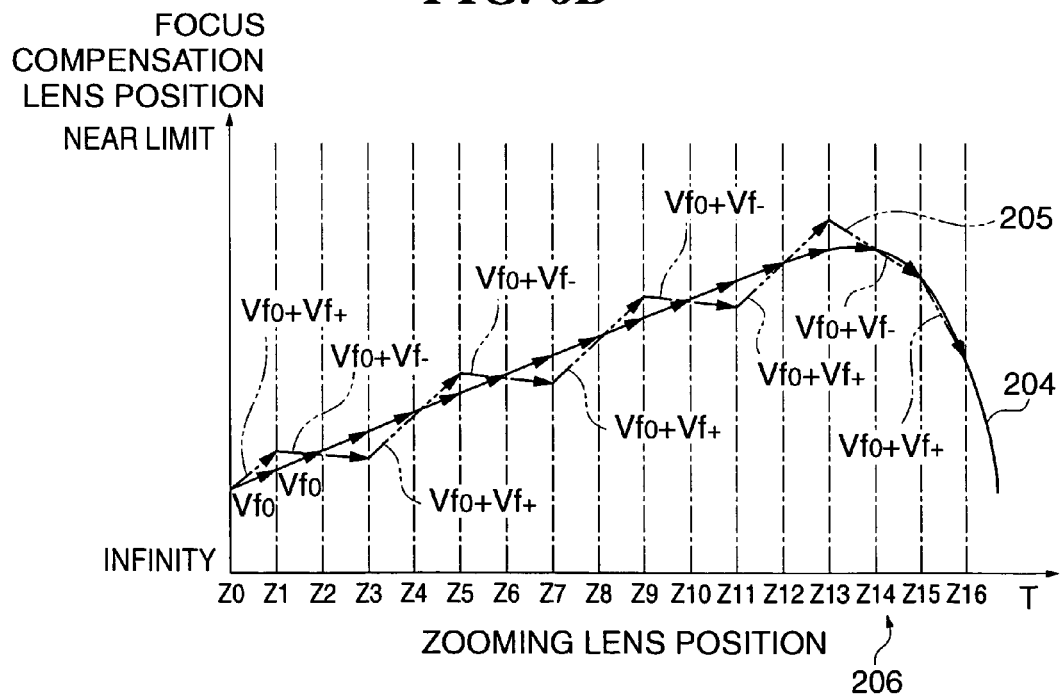

FIGS. 6A and 6B are diagrams useful in explaining an example of the locus tracking method. The abscissa of the graph shown in each of FIGS. 6A and 6B indicates the position of the zooming lens group 102. The ordinate in FIG. 6A shows a peak level within a vertical synchronization period of high-frequency components (sharpness signal) of a luminance signal as an AF evaluation value, and the ordinate in FIG. 6B shows the position of the focus compensation lens 105. In FIG. 6B, a focus locus when carrying out zooming for a given subject is indicated by a curved line 204. In FIG. 6B, the driving direction of the focus compensation lens 105 which is upward (that is, toward near limit) is taken as positive, and the driving direction which is downward (that is, toward infinity) is taken as negative. When the focus compensation lens 105 follows the focus locus 204 while maintaining the in-focus state, the magnitude of the AF evaluation value changes like a straight line 201 shown in FIG. 6A. It is generally known that in zooming with the in-focus state maintained, the AF evaluation value level assumes a substantially constant value.

In FIG. 6B, the driving-speed of the focus lens that traces the focus locus 204 during a zoom is designated by Vf0, and the actual driving speed of the focus compensation lens 105 is designated by Vf. When the driving speed of the focus compensation lens 105 is varied to a higher value or a lower value with respect to the speed Vf0 when the focus locus 204 is traced, while zooming, the resulting locus 205 is obtained. At this time, the AF evaluation value level decreases as the locus traced by the focus compensation lens 105 is deviated from the focus locus 204, and therefore the AF evaluation value shows a repetitive vertical variation like a curved line 203 shown in FIG. 6A. In other words, the AF evaluation value reaches its maximum at a zoom position at which the focus locus 204 and the locus 205 intersect, and the AF evaluation value reaches its minimum at a zoom position where the moving direction vector 205 changes. A straight line 202 shown in FIG. 6A shows the minimum value of the curved line 203. By setting a threshold TH1 to the minimum level indicated by the straight line 202 and changing the direction of movement of the locus 205 each time the AF evaluation value 203 becomes equal to the threshold TH1, the driving direction of the focus compensation lens 105 can be set closer to the focus locus 204. That is, each time the image gets out of focus or blurs by the difference between the AF evaluation values 201 and 202, the driving direction and driving speed of the focus compensation lens 105 are controlled so as to decrease the amount of image blur, thus carrying out zooming with a reduced amount of image blur.

By using this technique, when carrying out zooming in a direction in which the focus loci shown in FIG. 4 diverge, in other words, from wide angle to telephoto, even if the focus speed Vf0 for following the true focus locus is unknown, by carrying out the operation of following the locus 205 shown in FIG. 6B through control of the focus speed Vf, the focus locus can be selectively tracked so that the AF evaluation value level does not drop below the threshold TH1, that is, so that an amount of image blur greater than a certain level does not occur.

If the speed correction value in the positive direction is designated by Vf+ and the speed correction value in the negative direction Vf−, then the driving speed Vf of the focus compensation lens 105 is determined by the following equations:

$$Vf = Vf0 + Vf+ \quad (1)$$

$$Vf = Vf0 - Vf- \quad (2)$$

The speed correction values Vf+, Vf− are set so as to prevent deviation of the focus compensation lens 105 position from the selected locus to be followed, such that an internal angle formed by the two Vf direction vectors obtained from equations (1) and (2) is divided into two equal parts by the Vf0 direction vector.

Thus, as described above, according to the present embodiment, when zooming from wide angle to telephoto, power is supplied to the external ranging unit 126 and the obtained subject distance information is used together with the AF evaluation value. As a result, cam locus tracking performance during zooming can be improved.

Figure 10:
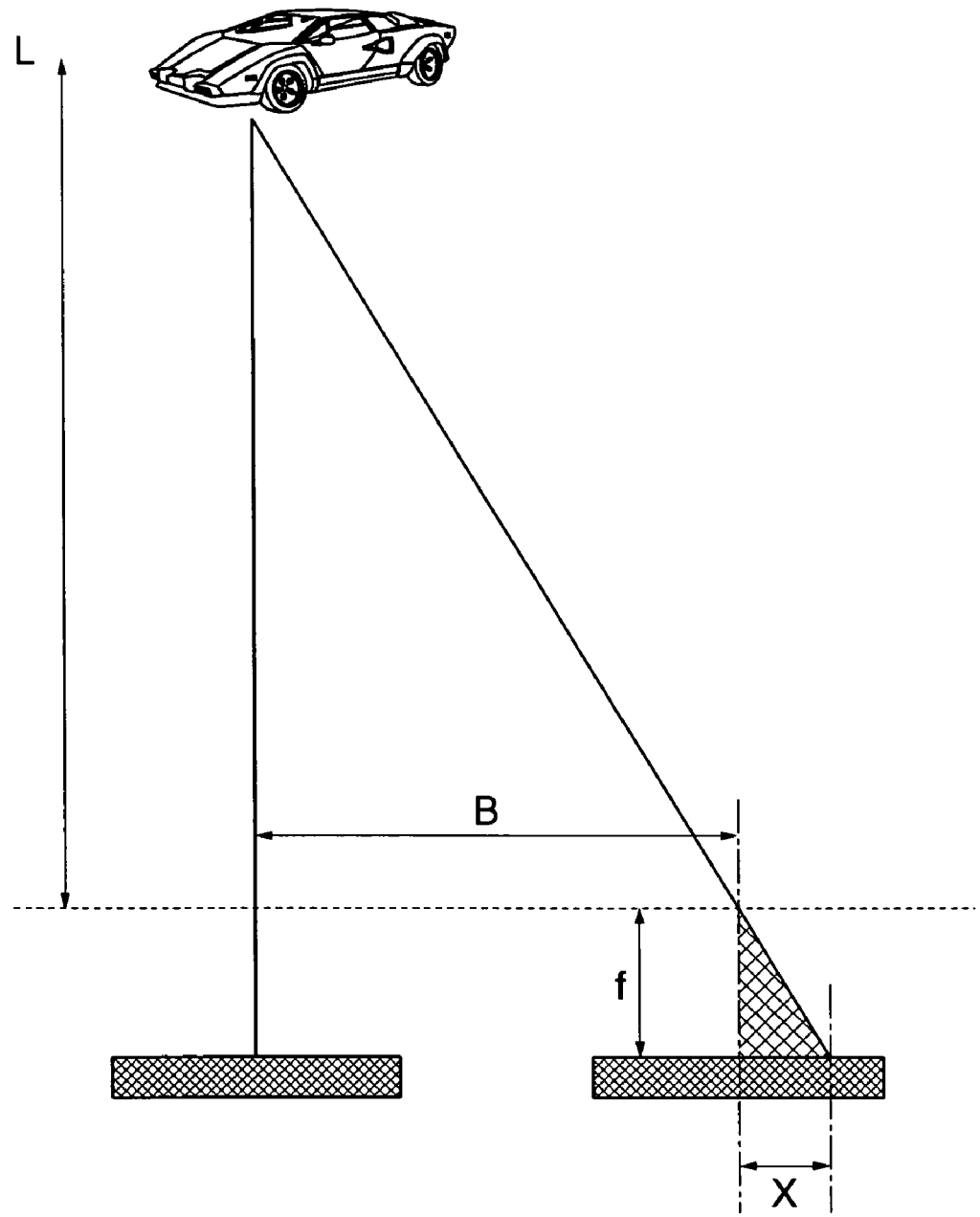
FIG. 10 is a diagram showing the principles of conventional triangulation.
Figure 11:
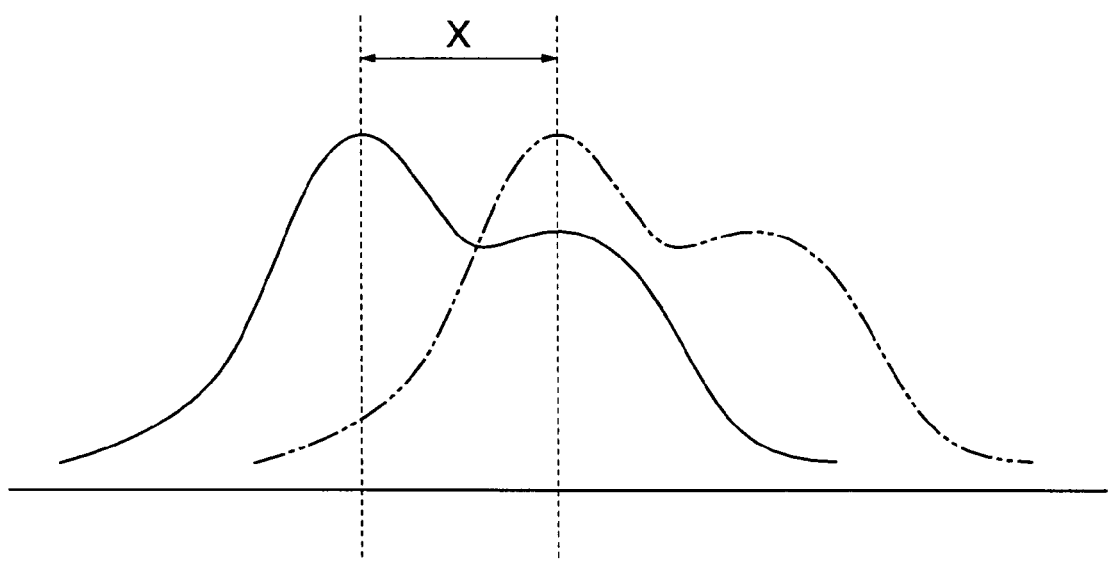
FIG. 11 is a diagram showing the principles of conventional correlation calculations.

It should be noted that in the embodiments described above, the information indicative of the distance to the subject is acquired. This subject distance information is obtained by calculating the distance to the subjection through correlation between two image signals as explained before with reference to FIGS. 10 and 11. Alternatively, the position of the focus compensation lens at which the subject image is brought into focus may be calculated from the amount of offset due to a phase difference as the correlation between two image signals (see FIG. 12).

It is to be understood that the object of the present invention may also be accomplished by supplying a system or an apparatus (e.g., a personal computer) with a storage medium in which a program code of software which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the embodiments described above, and hence the program code and the storage medium in which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program code may be downloaded via a network from another computer, a database or the like, not shown, connected to the Internet, a commercial network, a local area network, or the like.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. An image pickup apparatus comprising:
   a focus tens;
   a signal processing device that outputs a video signal from an optical image formed through said focus lens;
   a lens driving device that drives said focus lens;
   a first detecting device that detects a focus signal from the video signal output from said signal processing device;
   a second detecting device that detects a phase difference between a pair of image signals of a subject passing through different light paths;
   a focus adjusting device that adjusts focus based on results of detection by said first detecting device and said second detecting device;
   a storing device that stores a plurality of locus information; and
   a power control device that controls, when zooming from telephoto to wide angle is performed and the result of detection by said first detecting device shows that the image pickup apparatus is an in-focus status, to cut off power to said second detecting device;
   wherein said power control device further controls, after said focus adjusting device finishes adjusting the focus and when zooming from wide angle to telephoto is performed, to supply the power to said second detecting device so as to cause said second detecting device to detect the phase difference, select one of the stored plurality of locus information based on the detected phase difference, and track a cam locus based on the selected locus information.

* * * * *